United States Patent
Yamamoto et al.

(10) Patent No.: US 6,478,162 B1
(45) Date of Patent: Nov. 12, 2002

(54) WEIGHT SORTER

(75) Inventors: Taizo Yamamoto, Osaka; Masakiyo Inoue, Nara; Yoshihisa Kawaguchi, Kasihara, all of (JP)

(73) Assignee: Shionogi Qualicaps Co., Ltd., Nara (JP)

( * ) Notice: Subject to any disclaimer, the term of this patent is extended or adjusted under 35 U.S.C. 154(b) by 0 days.

(21) Appl. No.: 09/508,283

(22) PCT Filed: Jul. 9, 1998

(86) PCT No.: PCT/JP98/03078
§ 371 (c)(1),
(2), (4) Date: Mar. 9, 2000

(87) PCT Pub. No.: WO00/03211
PCT Pub. Date:Jan. 20, 2000

(51) Int. Cl.[7] .............................. B07C 5/28; G01G 19/00
(52) U.S. Cl. ........................ 209/593; 209/645; 209/919; 177/105; 177/108; 177/145
(58) Field of Search ................................ 209/592, 593, 209/595, 645, 646, 649, 919; 177/54, 55, 105, 108, 125, 145

(56) References Cited

U.S. PATENT DOCUMENTS

| | | | |
|---|---|---|---|
| 2,781,995 A | * | 2/1957 | Magnuson et al. ..... 209/646 X |
| 4,811,802 A | | 3/1989 | Yamamoto et al. ....... 177/50 X |
| 5,044,504 A | * | 9/1991 | Powell, Jr. ............... 209/592 X |
| 5,249,689 A | * | 10/1993 | Wergeland et al. ..... 209/646 X |
| 6,114,636 A | * | 9/2000 | Cane' et al. ................. 177/145 |
| 6,162,998 A | * | 12/2000 | Wurst et al. ............ 209/592 X |

FOREIGN PATENT DOCUMENTS

| | | |
|---|---|---|
| EP | 0 685 714 A1 | 12/1995 |
| GB | 2 234 357 A | 1/1991 |
| JP | 58-30379 | 2/1983 |
| JP | 63-309265 | 12/1988 |

* cited by examiner

*Primary Examiner*—Tuan N. Nguyen
(74) *Attorney, Agent, or Firm*—Birch, Stewart, Kolasch & Birch, LLP

(57) ABSTRACT

The invention provides a weight selecting apparatus capable of automatically performing calibration, and provides a weight selecting apparatus capable of certainly carrying objects to be inspected with a relatively simple mechanism and performing weight measurement of the objects. The objects, after being subjected to weight measurement by a first weighing unit 2, are sampled by a sampler 5, and those of the objects thus sampled are subjected to weight measurement by a second weighing unit 6. A calibration unit compares, for the same object, the measured result with that obtained by the first weighing unit 2 and discriminates whether or not a difference therebetween is within a specific error range, to perform calibration of the first weighing unit 2. Further, as a carrier 3 for carrying the objects to the weighing unit 2 one by one, there is used an intermittently rotatable carrying roller 32 having in its outer peripheral surface portion a plurality of carrying pockets 321.

4 Claims, 9 Drawing Sheets

WEIGHT SORTER

This application is the national phase under 35 U.S.C. §371 of PCT International Application No. PCT/JP98/03078 which has an International filing date of Jul. 9, 1998, which designated the United States of America.

TECHNICAL FIELD

The present invention relates to a weight selecting apparatus for automatically measuring weights of products and other articles in the various industrial fields of medicines, chemicals, foods and the like; inspecting whether or not the weight of each of the objects to be inspected is within a specific weight range; and selecting the objects into non-defective ones and defective ones. In particular, the present invention relates to a weight selecting apparatus capable of automatically performing, at specific intervals, a calibrating operation of inspecting the accuracy of a weighing unit for performing weight measurement thereby certainly performing inspection at a high reliability, and also relates to a weight selecting apparatus for certainly carrying objects to be inspected with a relatively simple mechanism and performing weight measurement of the objects.

BACKGROUND ART

In the various industrial fields, as one of quality control items, it has been performed to measure weights of products and other articles; inspect whether or not the weight of each of the objects to be inspected is within a specific range; and select the objects into non-defective ones and defective ones. In the field of medicines, particularly, weight inspection has been regarded as one of extremely important inspection items. This is because a variation in weight directly leads to a variation in effective content and such a variation in effective content presents a large problem particularly for a medicament with its does required to be strictly managed.

Recently, weights of medicines such as capsules have come to be automatically inspected using a weight selecting apparatus, and as such a weight selecting apparatus there has been known an apparatus shown in FIG. 9.

The weight selecting apparatus shown in FIG. 9, adapted for weight inspection of capsules, includes a hopper "a" for continuously feeding capsules as objects to be inspected; a magazine "b" for feeding the capsules from the hopper "a" to a weighing base "g" one by one; a weighing unit "c" for measuring weights of the capsules; an acceptability determining unit (not shown) for determining the acceptability of each capsule on the basis of the measured result; and a selecting/recovering unit "d" for selecting the capsules into non-defective ones and defective ones on the basis of the acceptability determination and recovering them.

The hopper "a" is formed into an approximately funnel shape in which a specific number of capsules are to be stored. As the amount of capsules stored in the hopper "a" is reduced, new capsules are supplied from a large hopper "e" shown in FIG. 9, whereby a specific number of capsules are usually stored in the hopper "a".

The magazine "b" is a vertically movable pipe with its upper end inserted through the hopper "a", and a shutter "f" for opening/closing a lower end opening portion of the magazine "b" is mounted to the lower end portion of the magazine "b". The weighing unit "c" includes a V-rail "h", having a V-shaped cross section, for guiding each capsule supplied from the magazine "b" to a weighing base "g"; a pusher "i" for turning sideways each capsule supplied on the V-rail "h" and pushing the capsule out of the V-rail "h" to move it on the weighing base "g"; a stopper "n" for stopping each capsule moved onto the weighing base "g" at a specific position; and an injector "p" for moving each capsule from the weighing base "g" to the selecting/recovering unit. The selecting/recovering unit "d" includes an ejecting chute "j" for ejecting each capsule after weight measurement; a defective ejecting chute "k" branched from the ejecting chute "j"; and a selecting gate "m" provided at a branch point where the defective ejecting chute "k" is branched from the ejecting chute "J".

The weight inspection using the above weight selecting apparatus is performed as follows:

That is to say, the capsules in the hopper "a" are charged in the magazine "b" in a state being aligned in a row by vertical motion of the magazine "b", and as shown by a broken line in FIG. 9, the shutter "f" is temporarily opened when the magazine "b" reaches the lowermost point and thereby one of the capsules is discharged from the lower end opening portion of the magazine and is placed on the V-rail "h". The pusher "i" is immediately moved in the horizontal direction to turn sideways the capsule on the V-rail "h" and move it on the weighing base "g". The moving capsule is stopped by the stopper "n" at a specific position on the weighing base "g", followed by weight measurement. After weight measurement, as shown by a broken line in FIG. 9, the stopper "n" is moved downward to open a charging port of the ejection chute "j" and at the same time the injector "p" is moved as shown by an arrow in FIG. 9 to charge the capsule on the weighing base "g" into the ejection chute "j" of the selecting/recovering unit "d". At this time, the acceptance determining unit (not shown) determines, on the basis of the result of weight measurement, whether or not the weight of the capsule is within a specific range, and opens/closes the selecting gate on the basis of the determined result. In the case where the capsule is determined as a non-defective capsule having a weight being in the specific range, the selecting gate "m" closes the port of the defective ejecting chute "k", whereby the non-defective capsule is ejected outside the apparatus through the ejecting chute "j". On the other hand, in the case where the capsule is determined as a defective capsule having a weight being out of the specific range, as shown by a dotted line in the figure, the selecting gate "m" is opened and thereby the upper end opening portion of the defective ejecting chute "k" is opened and also the selecting gate "m" blocks the ejecting chute "j" at the branch point between the defective capsule ejecting chute "k" and the same to introduce the defective capsule into the defective ejecting chute "k". Thus, the defective capsule is selected and recovered through the defective ejecting chute "k". Thereafter, the above operation is continuously repeated, to thus automatically select the weights of the capsules.

The related art weight selecting apparatus, however, has a disadvantage that a so-called calibration for inspecting and confirming the accuracy of weight measurement by the weighing unit "c" must be manually performed each time, and thereby the calibration work is made burdensome.

To be more specific, the "calibration" is to compare a measuring instrument with a standard (reference) instrument or a standard sample, confirm that an error therebetween is within a reference value, and to adjust and repair the measuring instrument if the error is out of the reference value; and to stably obtain products each having a specific quality, each measuring instrument must be subjected to calibration at a necessary period determined according to the purpose and importance.

In the above-described related art weight selecting apparatus, the calibration is performed by confirming the accuracy of a balance of the weighing unit "c" using a reference weight, and adjusting and repairing the balance if an error measured is more than a reference value. However, since such an apparatus is generally configured such that a number of inspection lines composed of measurement mechanisms shown in FIG. 9 are arranged in a plurality of rows (6 rows and 12 rows types, commercially available apparatus) for processing a large amount of capsules for a short time, the calibration must be performed using the reference weight for each line, so that the calibration work takes a large labor. As a result, it is expected to develop a weight selecting apparatus capable of automatically performing the above calibration.

The above-described related art weight selecting apparatus also has a disadvantage that since capsules are carried from the hopper "a" to the weighing base "g" one by one, followed by weight measurement, and the capsules are fed to the selecting/recovering unit "d", the carrying mechanism is complicated.

That is to say, as described above, the related art weight selecting apparatus is configured such that one capsule is discharged from the lower end of the magazine "b" and is placed on the V-rail "h" when the vertically movable magazine "b" reaches the lowermost point, and the capsule is turned sideways by the pusher "i" and at the same time it is moved to the weighing base "g" for weight measurement; and directly after weight measurement, the stopper "n" is moved to open the charging port of the ejecting chute "j" and also the capsule on the weighing base "g" is charged into the ejecting chute "g" by the injector "p". That is to say, the carrying mechanism for carrying the capsule has a number of moving parts such as the magazine "b", pusher "i", stopper "n", injector "p", and the like, and a drive mechanism and a control mechanism for moving these parts at correct timings are required to be provided. In this way, the related art weight selecting mechanism has a very complicated mechanism for carrying capsules, which obstructs the improvement of processing ability and raises the parts cost, assembling cost and the like, and further may cause a failure in the carrying step such as breakage of capsules during carrying them.

In view of the foregoing, the present invention has been made, and a first object of the present invention is to provide a weight selecting apparatus capable of automatically performing calibration, that is, eliminating the necessity of performing the burdensome calibrating operation by manual work, thereby effectively performing high accurate, high reliable weight measurement.

A second object of the present invention is to provide a weight selecting apparatus capable of certainly carrying objects to be inspected with a relatively simple mechanism, measuring weights of the objects, and certainly ejecting the objects after weight measurement.

DISCLOSURE OF INVENTION

To achieve the first object, according to a first invention, there is provided a weight selecting apparatus including: a feed unit for continuously feeding objects to be inspected; a first weighing unit for measuring weights of the objects; a carrying means for carrying the objects fed from the feed unit to the first weighing unit one by one; an acceptability determining unit for comparing the result of weight measurement by the first weighing unit with a specific reference value to determine the acceptability of each of the objects; a selecting means for selecting the objects into non-defective ones each having a weight being within a specific weight range and defective ones each having a weight being out of the specific weight range on the basis of the determined results by the acceptability determining unit; a sampling means for performing sampling for the objects having been subjected to weight measurement by the first weighing unit; a second weighing unit for calibration, which is adapted to measure weights of those of the objects sampled by the sampling means; and a calibration unit for comparing, for the same object, the result of weight measurement by the first weighing unit with the result of weight measurement by the second weighing unit and determining whether or not a difference therebetween is within a specific error range; wherein in a usual state, the objects continuously fed from the feed unit are carried to the first weighing unit one by one by the carrying means and are subjected to weight measurement by the first weighing unit, being subjected to acceptability determination on the basis of the measured results by the acceptability determining unit, and are selected into non-defective ones and defective ones on the basis of the determined results by the selecting means and are recovered; and at specific intervals, the objects having been subjected to weight measurement by the first weighing unit are subjected to sampling by the sampling means; those of the objects thus sampled are subjected to weight measurement by the second weighing unit; and for the same object, the measured result is compared with that obtained by the first weighing unit by means of the calibration unit, to perform calibration of the first weighing unit.

That is to say, in the weight selecting apparatus of the present invention, the objects having been subjected to weight measurement by the first weighing unit are subjected to sampling by the sampling means, and those of the objects thus sampled are subjected to weight measurement by the second weighing unit. Then, the calibration unit compares, for the same object, the measured result with that obtained by the first weighing unit and discriminates whether or not a difference therebetween is within a specific error range, to thus perform calibration of the first weighing unit by making use of the objects to be inspected without use of a reference weight.

Accordingly, it is possible to automatically perform calibration by starting the sampling means, second weighing unit, and calibration unit at specific intervals arbitrarily set.

In the weight selecting apparatus of the present invention, while not exclusively, the above selecting means may include an ejecting chute for ejecting the objects having been subjected to weight measurement by the first weighing unit; a defective ejecting chute, branched from the ejecting chute, for introducing the objects to reversely rotatable non-defective recovering/carrying device; and a non-defective/defective selecting shutter, provided at the branch point where the defective ejecting chute is branched from the ejecting chute, for opening/closing a port of the defective ejecting chute; wherein the defective ejecting chute, non-defective/defective selecting shutter, and defective recovering/carrying device of the selecting means are used as the sampling means upon calibration.

That is to say, in a usual state, the non-defective/defective selecting shutter is opened/closed on the basis of the determined results obtained by the acceptability determining unit, and the non-defective objects are ejected through the ejecting chute to be recovered and the defective objects are introduced to the defective recovering/carrying device through the defective ejecting chute which is branched from the ejecting chute by opening the non-defective/defective selecting shutter and are recovered, to thereby select the objects into nondefective ones and defective ones and recover them. On the other hand, upon calibration, the non-defective/defective selecting shutter is unconditionally opened to introduce the objects having being subjected to weight measurement by the first weighing unit to the defective recovering/carrying device through the defective ejecting chute, and the defective recovering/carrying device is reversely rotated to carry the objects to in the direction different from the carrying direction upon usual defective recovery, that is, to feed the objects to the second weighing unit, whereby the objects are subjected to sampling for calibration.

Since the sample means is configured using the selecting means as described above, it is possible to certainly perform sampling for calibration with a relatively simple mechanism without provision of any complicated path, and hence to miniaturize the apparatus and reduce the parts cost. Further, since the usual weight measurement or inspection cannot be naturally performed until the accuracy of the first weighing unit is confirmed, the inspection efficiency is not reduced even by performing sampling for calibration by making use of the selecting means.

In the case where the selecting means is comprised of the ejecting chute, defective ejecting chute, and non-defective/defective selecting shutter, preferably, a defective ejection sensor for detecting passing of the objects is mounted on the defective ejecting chute or in the vicinity of an ejection port thereof, and a reversely rotatable non-defective recovering/carrying device for recovering non-defective ones of the objects is disposed ahead of the ejecting chute, wherein ejection of the object determined as a defective one by the acceptability determining unit is detected by the defective ejection sensor, and in the case where the defective object is not detected, the non-defective recovering/carrying device is reversely rotated to prevent entrainment of the defective object in the non-defective objects. This makes it possible to certainly prevent entrainment of a defective object into non-defective objects, and hence to perform weight inspection with a high reliability.

As described above, according to the weight selecting apparatus of the present invention, it is possible to automatically perform calibration, that is, eliminate the necessity of performing burdensome calibrating operation by manual works, and hence to reduce a labor required for monitoring or calibrating work by an operator and also effectively perform high accurate, high reliable weight inspection.

To achieve the above second object, according to a second invention, there is provided a weight selecting apparatus including: a feed unit for continuously feeding objects to be inspected; a weighing unit for measuring weights of the objects; a carrying means for carrying the objects fed from the feed unit to the weighing unit one by one; an acceptability determining unit for comparing the result of weight measurement by the weighing unit with a specific reference value to determine the acceptability of each of the objects; and a selecting means for selecting the objects into non-defective ones each having a weight being within a specific weight range and defective ones each having a weight being out of the specific weight range on the basis of the determined results by the acceptability determining unit; wherein the objects continuously fed from the feed unit are carried to the weighing unit one by one by means of the carrying means and subjected to weight measurement by the weighing unit, being subjected to acceptability determination on the measured results by the acceptability determining unit, and are selected into non-defective ones and defective ones on the basis of the determined results by the selecting means and are recovered; characterized in that the carrying means includes at least one intermittently rotatable carrying roller having in its outer peripheral surface portion a plurality of carrying pockets for containing the objects, wherein the objects are contained in the carrying pockets on a one-to-one basis and carried by intermittent rotation of the carrying roller; each of the objects is placed on a weighing base of the weighing unit at the lowermost point of the carrying roller in a state being contained in the corresponding one of the carrying pockets, being subjected to weight measurement in a period in which the carrying roller is left as intermittently stopped, and is moved from the weighing base by intermittent rotation of the carrying roller; and the object thus measured in weight is ejected from the carrying pocket and is transferred to the selecting means.

That is to say, the above weight selecting apparatus is configured such that as the carrying means for carrying objects to be inspected to the weighing unit one by one, there is used at least one carrying roller having a plurality of carrying pockets for containing the objects, wherein the objects fed from the feed unit are carried to the weighing base of the weighing unit by intermittent rotation of the carrying roller, being subjected to weight measurement, and are fed to the selecting means by intermittent rotation of the carrying roller. Accordingly, by provision of at least one carrying roller, objects to be inspected can be carried sequentially from the feed unit to the weighing base and to the selecting means, so that the carrying unit capable of certainly carrying the objects can be constituted of a reduced number of parts. Since the carrying unit may have at least one carrying roller as a simply movable part, that is, intermittently rotated part, it is possible to eliminate the necessity of provision of a complicated drive mechanism or control mechanism.

Consequently, according to the weight selecting apparatus of the present invention, as compared with the above-described related art weight selecting apparatus in which objects to be inspected are carried by controlling a number of movable parts requiring complicated motions with timings adjusted accurately, it is possible to accurately, certainly carry objects to be inspected by a simple mechanism with a reduced number of parts, and hence to improve the processing ability and reduce the cost.

In addition, the carrying means of the weight selecting apparatus uses the intermittently rotated carrying roller as a member for placing objects to be inspected on the weighing base one by one and moving them to the selecting means after weight measurement, and depending on the kind/feature of the objects and the specification of the feed unit for feeding the objects, the carrying means may be comprised of a combination of the carrying roller and another member. For example, like a first embodiment to be described later, the carrying unit can be comprised of a combination of the carrying roller and a feed drum for certainly charging the objects continuously fed from the feed unit into carrying pockets formed in the carrying roller, or like a second embodiment to be described later, it can be comprised of a combination of the carrying roller and a vibration feeder for sequentially feeding the objects into the carrying pockets of the carrying roller by vibration.

The carrying means using the intermittently rotated carrying roller is, of course, suitably used as the carrying means of the above-described weight selecting apparatus having the calibration function, whereby it is possible to improve the processing ability of the weight selecting apparatus having the calibration function and also to reduce the material cost and manufacturing cost.

BEST MODE FOR CARRYING OUT THE INVENTION

Hereinafter, embodiments of the present invention will be described in detail.

[Embodiment 1]

FIGS. 1 to 6 show a weight selecting apparatus according to a first embodiment of the present invention, for measuring weights of capsules, discriminating whether or not the weight of each capsule is within a specific weight range, automatically selecting the capsules into non-defective ones each being within the specific weight range and defective ones each being out of the specific weight range, and recovering them.

Figure 1:
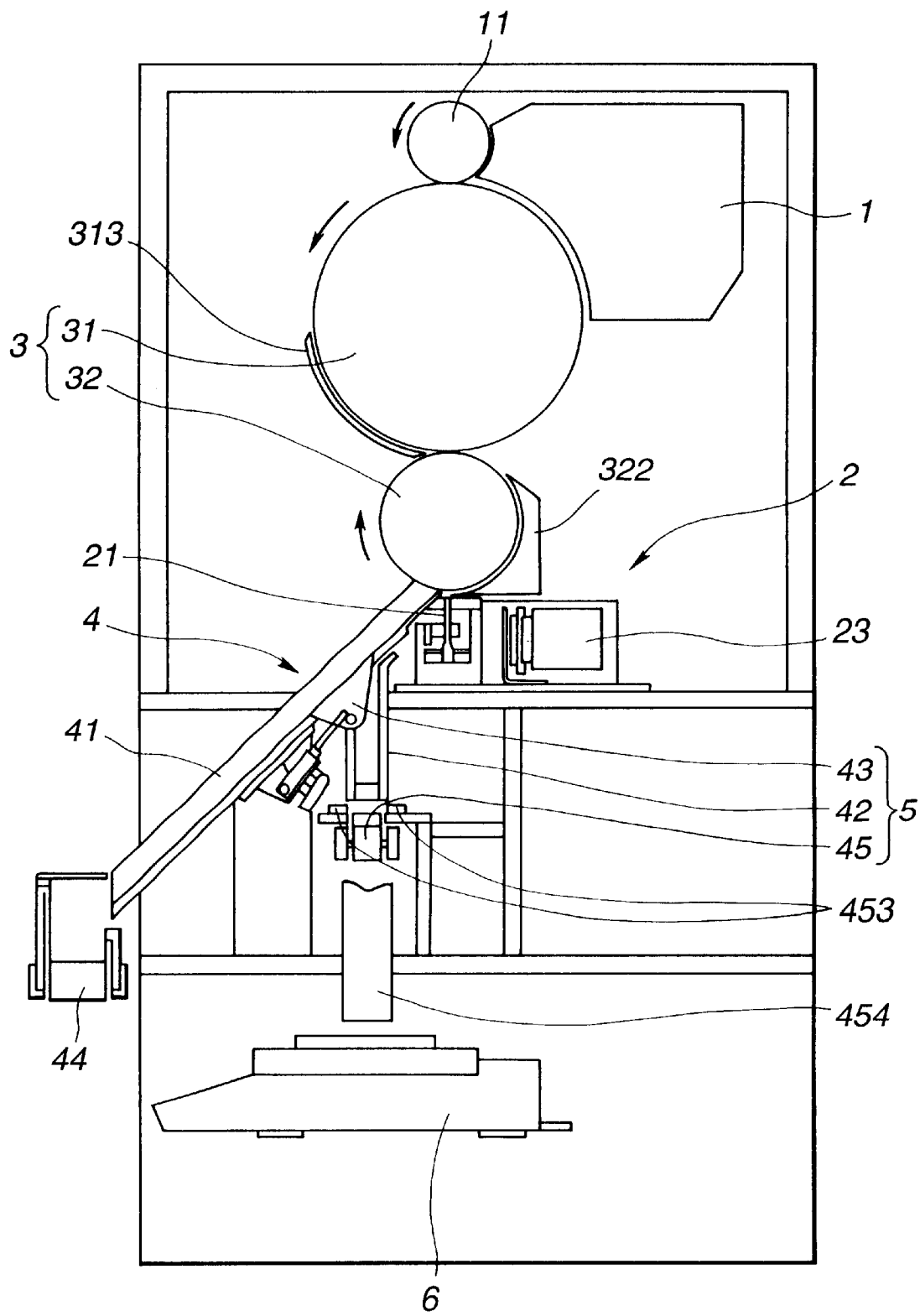
FIG. 1 is a front view showing the schematic configuration of a weight selecting apparatus according to a first embodiment of the present invention.
Figure 2:
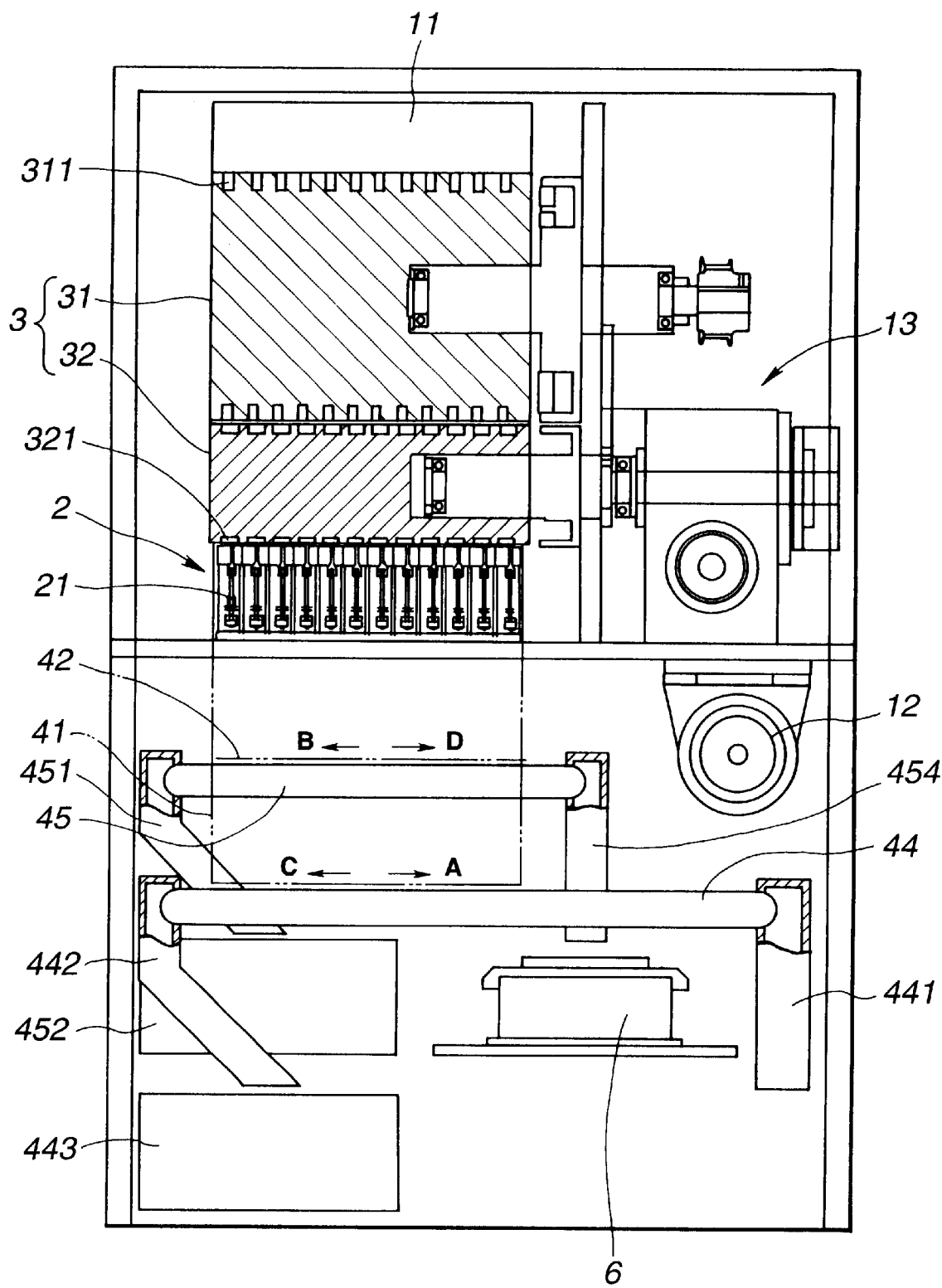
FIG. 2 is a side view showing the schematic configuration of the weight selecting apparatus shown in FIG. 1.

The weight selecting apparatus includes, as shown in FIGS. 1 and 2, a hopper 1 (feed unit) for storing a specific number of capsules and continuously feeding the capsules; a first weighing unit 2 for measuring weights of the capsules; a carrying means 3 for carrying the capsules supplied from the hopper 1 at random to the first weighing unit 2 one by one; an acceptability determining unit (not shown) for determining the acceptability of each capsule on the basis of the measured result obtained by the first weighing unit 2; a selecting means 4 for selecting the capsules into non-defective ones and defective ones on the basis of the determined results by the acceptability determining unit; a sampling means 5 for performing, upon calibration, sampling for the capsules after weight measurement; a second weighing unit 6 for measuring weights of those of the capsules sampled by the sampling means 5; and a calibration unit (not shown) for comparing, for each capsule sampled, the result of weight measurement by the first weighing unit 2 with the result of weight measurement by the second weighing unit 6, thereby performing calibration of the first weighing unit 2 on the comparison result.

The carrying unit 3 includes, as shown in FIGS. 1 and 2, a feed drum 31 rotatable with its outer peripheral surface being partially close to the hopper 1; and a carrying roller 32 rotatably disposed under the feed drum 31 with its outer peripheral surface being close to the outer peripheral surface of the feed drum 31.

Figure 3:
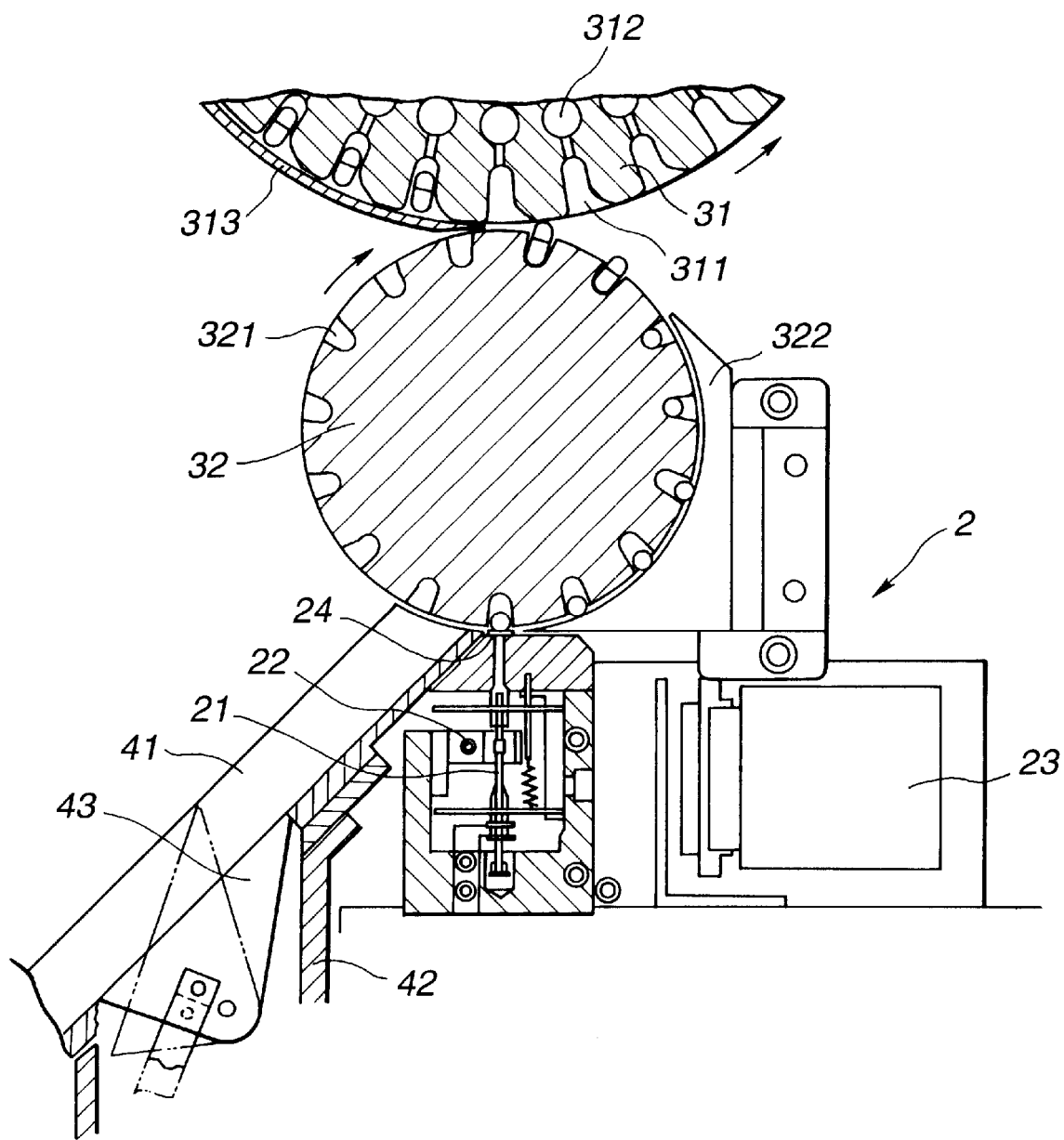
FIG. 3 is a sectional view, partly on an enlarged scale, showing a first weighing unit of the weight selecting apparatus shown in FIG. 1 and its neighborhood.

As shown in FIGS. 2 and 3, a number of feed pockets 311 for containing the capsules in upright postures (the wording "upright posture" means a posture of the capsule with its axis directed in the radial direction of the drum) are formed in the outer peripheral surface portion of the feed drum 31 in such a manner as to be aligned in a row along the peripheral direction of the drum 31, and a plurality of rows (12 rows in the figure) of the pockets 311 are formed in the outer peripheral surface portion of the drum 31. As shown in FIG. 3, the feed drum 31 has suction shoes 312 provided in the feed pockets 311 in such a manner as to be communicated to the feed pockets 311 in a one-to-one relationship. When each capsule is received from the hopper 1 into the feed pocket 311, the feed pocket 311 is sucked through the corresponding suction shoe 312, whereby the capsule can be smoothly transferred from the hopper 1 into the feed pocket 311. Further, as shown in FIGS. 1 and 3, the one-fourth peripheral portion of the feed drum 31 extending in the rotational direction from the upstream side to the vicinity of the lowermost point is covered with a cover plate 313 for preventing slip-off of the capsules.

Figure 4:
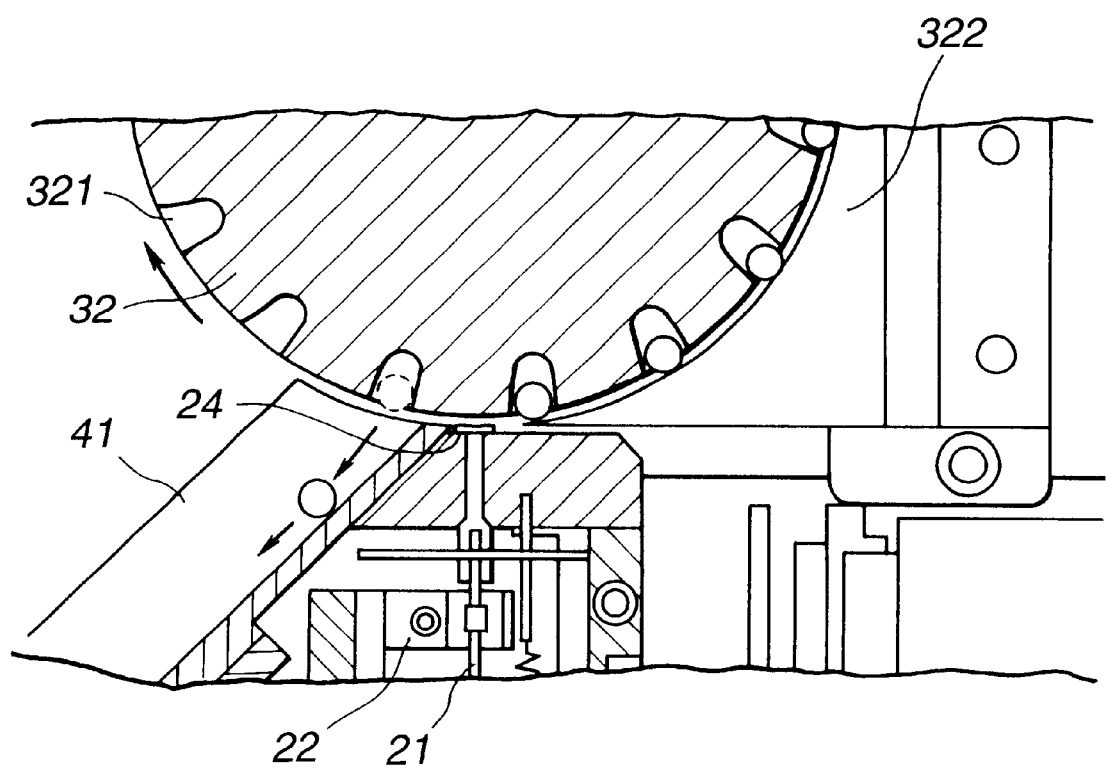
FIG. 4 is a sectional view, partly on an enlarged scale, illustrating the operation of the weight selecting apparatus for transferring capsules (objects to be inspected) from a pan (weighing base) of the first weighing unit to an ejecting chute of a selecting means.
Figure 5:
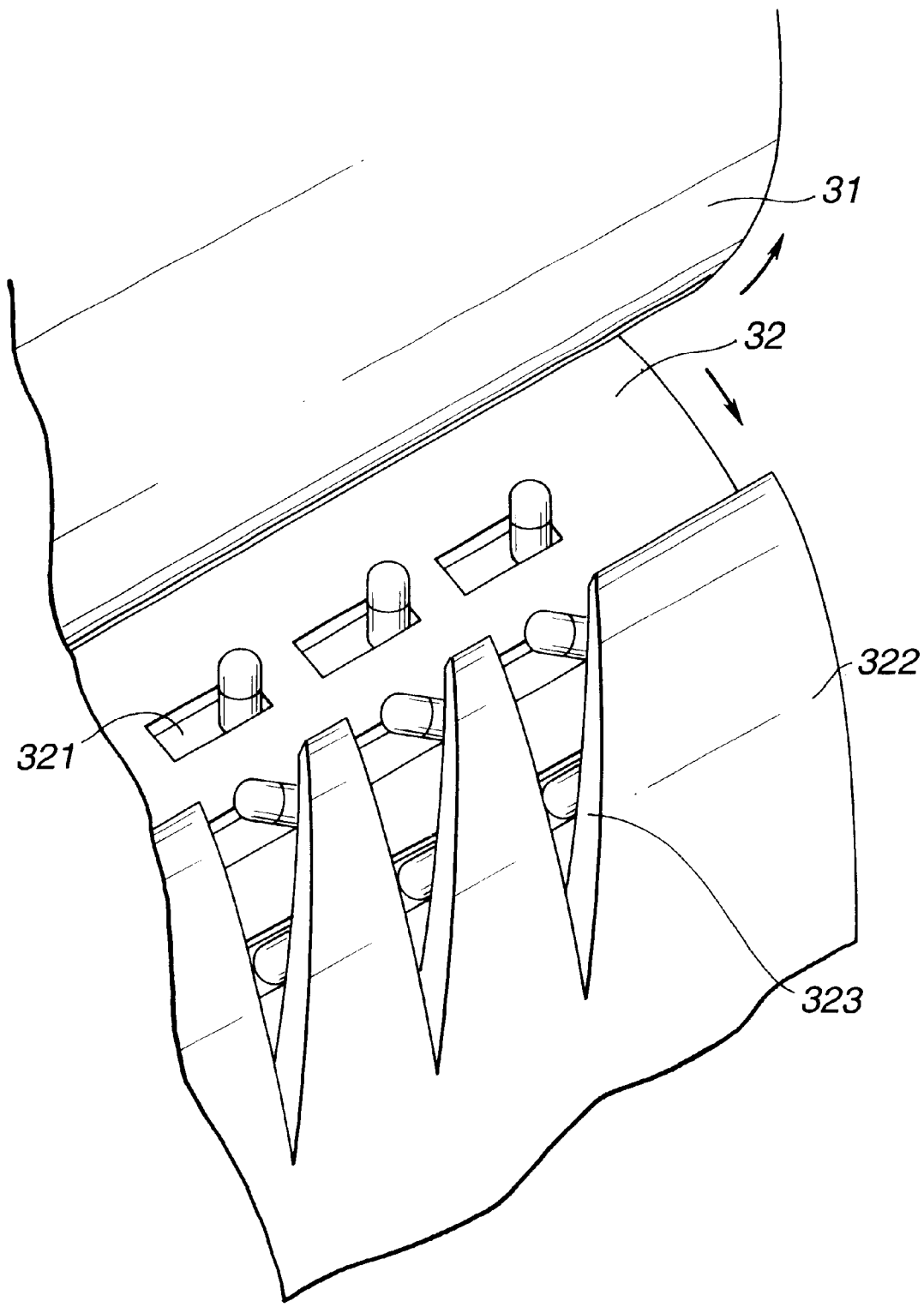
FIG. 5 is a sectional view, partly on an enlarged scale, showing a carrying roller and a posture changing plate of the weight selecting apparatus.

On the other hand, as shown in FIGS. 2 to 4, a number of carrying pockets 321 are formed in the outer peripheral surface portion of the carrying roller 32 in such a manner as to be aligned in a row along the peripheral direction correspondingly to the feed pockets 311 of the feed drum 31, and a plurality of rows (12 rows in the figures) of the carrying pockets 321 are formed correspondingly to the plurality of rows of the feed pockets 311. The carrying pocket 321 is adapted to contain the capsule in a lateral turning state (the wording "lateral turning state" means a state of the capsule with its axis directed in the axil direction of the roller). In this case, as shown in FIGS. 3 and 4, the leading end of the capsule contained in the carrying pocket 321 in the upright posture projects from the outer peripheral surface of the carrying roller 32. Further, as shown in FIGS. 1, 3 and 5, the about one-fourth outer peripheral portion of the carrying roller 32 in the rotational direction from the upstream side to the vicinity of the lowermost point is covered with a posture changing plate 322. As shown in FIG. 5, the upper end portion of the posture changing plate 322 has V-grooves 323 corresponding to the rows of the carrying pockets 321.

The feed drum 31 and the carrying roller 32 are driven by a drive source 12 such as a motor (see FIG. 2) while being controlled by an index device 13 (see FIG. 2) for indexing the rotating speed and angle of each of the feed drum 31 and the carrying roller 32 in such a manner as to be intermittently rotated in synchronization with each other in the reversed direction (the feed roller 31 is rotated counterclockwise and the carrying roller 32 is rotated clockwise in FIG. 1). Although the feed drum 31 and the carrying roller 32 are intermittently rotated by control of the index device 13 in this embodiment, they may be intermittently rotated by a step motor (not shown) in place of the index device 13.

Next, as shown in FIGS. 1 to 3, the first weighing unit 2 includes a differential transformer type balance 21 having a pan (weighing base) 24 positioned close to the lowermost point of the peripheral surface of the carrying roller 32. The weight of each capsule carried by the carrying roller 32 is measured by the differential transformer type balance 21. In this case, as shown in FIG. 2, the differential transformer balances 21 are arranged in a one-to-one relationship with the rows of the carrying pockets 321 of the carrying roller 32. In the example shown in FIG. 2, 12 pieces of the differential transformer balances 21 are arranged correspondingly to 12 rows of the carrying pockets 321. In FIG. 3, reference numeral 22 indicates a differential transformer, and 23 is an amplifier for the differential transformer. While not particularly shown, the upper surface of the pan 24 of the differential transformer type balance 21 is formed such that the central portion is recessed in an approximately V-shape allowing a capsule to be placed on the recess and to be stably subjected to weight measurement.

The result of weight measurement by each differential transformer type balance 21 of the first weighing unit 2 is supplied to the acceptability determining unit (not shown), and the acceptabilities of the weights of the capsules are determined for each differential transformer type balance 21, that is, for each pocket row. The determination by the acceptability determining unit is performed by comparing the result of weight measurement by each differential transformer balance 21 with a preset specific reference value and discriminating whether or not a difference therebetween is within a specific allowable range. If the difference is within the allowable range, the capsule is determined as a non-defective one, and if the difference is more than the allowable range, it is determined as a defective one.

The selecting means 4 includes, as shown in FIG. 1, a square pipe-like ejecting chute 41, a square pipe-like defective ejecting chute 42, and a non-defective/defective selecting shutter 43. The ejecting chute 41 is tilted in a state in which the upper end opening portion is close to the outer peripheral surface of the roller 32 and is adjacent to the differential transformer type balance 21 in the vicinity of the lowermost point of the carrying roller 32. The defective ejecting chute 42 is branched from an intermediate portion of the ejecting chute 41 and extending downward. The non-defective/defective selecting shutter 43 is provided at a branch point where the defective ejecting chute 42 is branched from the ejecting chute 41 and is adapted to open/close the upper end opening portion of the defective ejecting chute 42.

The ejecting chutes 41 are arranged in a one-to-one relationship with the rows of the carrying pockets 321 of the carrying roller 32. While not clearly shown, 12 pieces of the ejecting chutes 41 are arranged correspondingly to 12 rows of the carrying pockets 321. The defective ejecting chute 42 and the non-defective/defective selecting shutter 43 are mounted to each ejecting chute 41. As shown in FIGS. 1 and 3, each non-defective/defective selecting shutter 43 is usually kept in a state of blocking the upper end opening portion of the defective ejecting chute 42, and when the defective determination is performed by the acceptability determining unit (not shown), as shown by a two-dot chain line in FIG. 3, the non-defective/defective selecting shutter 43 is opened to open the upper end opening portion of the defective ejecting chute 42 and block the ejecting chute 41, whereby the capsules flowing through the ejecting chute 41 are dropped in the defective ejecting chute 42.

As shown in FIGS. 1 and 2, a non-defective recovering conveyor 44 as a reversely rotatable non-defective recovering/carrying device is disposed ahead of the ejecting chute 41. A non-defective capsule ejected through the ejecting chute 41 is carried by the non-defective recovering conveyor 44, and is recovered through a non-defective recovering chute 441 (see FIG. 2). A defective recovering conveyor 45 as a reversely rotatable defective recovering/carrying device is disposed ahead of the defective ejecting chute 42, so that a defective capsule ejected through the defective ejecting chute 42 is carried by the defective recovering conveyor 45 and is recovered in a defective recovering vessel 452 (see FIG. 2) through a defective recovering chute 451 (see FIG. 2). In this case, a defective ejection sensor 453 (see FIG. 1) composed of a pair of light emitting and receiving devices are arranged in the vicinity of the lower end opening portion of each defective ejecting chute 42. The defective ejection sensor 453 detects passing of the capsule, to thereby confirm whether or not the capsule determined as the defective one by the acceptability determining unit (not shown) is ejected through the defective ejecting chute 42.

To carry capsules to the non-defective recovering chute 441 and defective recovering chute 451, as described above, the non-defective recovering conveyor (non-defective recovering/carrying device) 44 is usually rotated in the direction A in FIG. 2 and the defective recovering conveyor (defective recovering/carrying device) 45 is usually rotated in the direction B in FIG. 2; however, each of the non-defective recovering conveyor 44 and defective recovering conveyor 45 can be reversely rotated. According to the circumstances, the non-defective recovering conveyor 44 is reversely rotated in the direction C in FIG. 2, and the defective recovering conveyor 45 is reversely rotated in the direction D in FIG. 2.

To be more specific, in the case where the defective ejection sensor 453 (see FIG. 1) does not confirm ejection of any defective capsule, the non-defective recovering conveyor 44 is reversely rotated in the direction shown by an arrow C in FIG. 2 to recover all of the capsules on the non-defective recovering conveyor 44 in a temporarily storing vessel 443 through a temporarily storing chute 442. Meanwhile, in calibration of each differential transformer type balance 21 of the first weighing unit 2, the defective recovering conveyor 45 is reversely rotated in the direction shown by an arrow D in FIG. 2 on the basis of a command supplied from the calibration unit (not shown) to drop all of the capsules on the defective recovering conveyor 45 in the second weighing unit 6 through a sampling chute 454.

Here, the defective ejecting chute 42, non-defective/defective selecting shutter 43, and defective recovering conveyor 45, which constitute main parts of the above selecting means 4, also constitute main parts of the above sampling means 5. For calibration, capsules for calibration are sampled by the sampling means 5 including these defective ejecting chute 42, non-defective/defective selecting shutter 43, and defective recovering conveyor 45.

That is to say, upon calibration, on the basis of a command supplied from the calibration unit (not shown), the non-defective/defective selecting shutter 43 is unconditionally opened irrespective of the determined result by the acceptability determining unit (not shown) or without acceptability determination to introduce all of the capsules from the ejecting chute 41 onto the defective recovering conveyor 45 through the defective ejecting chute 42, and the defective recovering conveyor 45 is reversely rotated in the direction, shown by an arrow D in FIG. 2, reversed to the normally rotational direction upon recovery of defective capsules, to feed the capsules to the second weighing unit 6 through the sampling chute 454 for sampling capsules for calibration.

Figure 6:
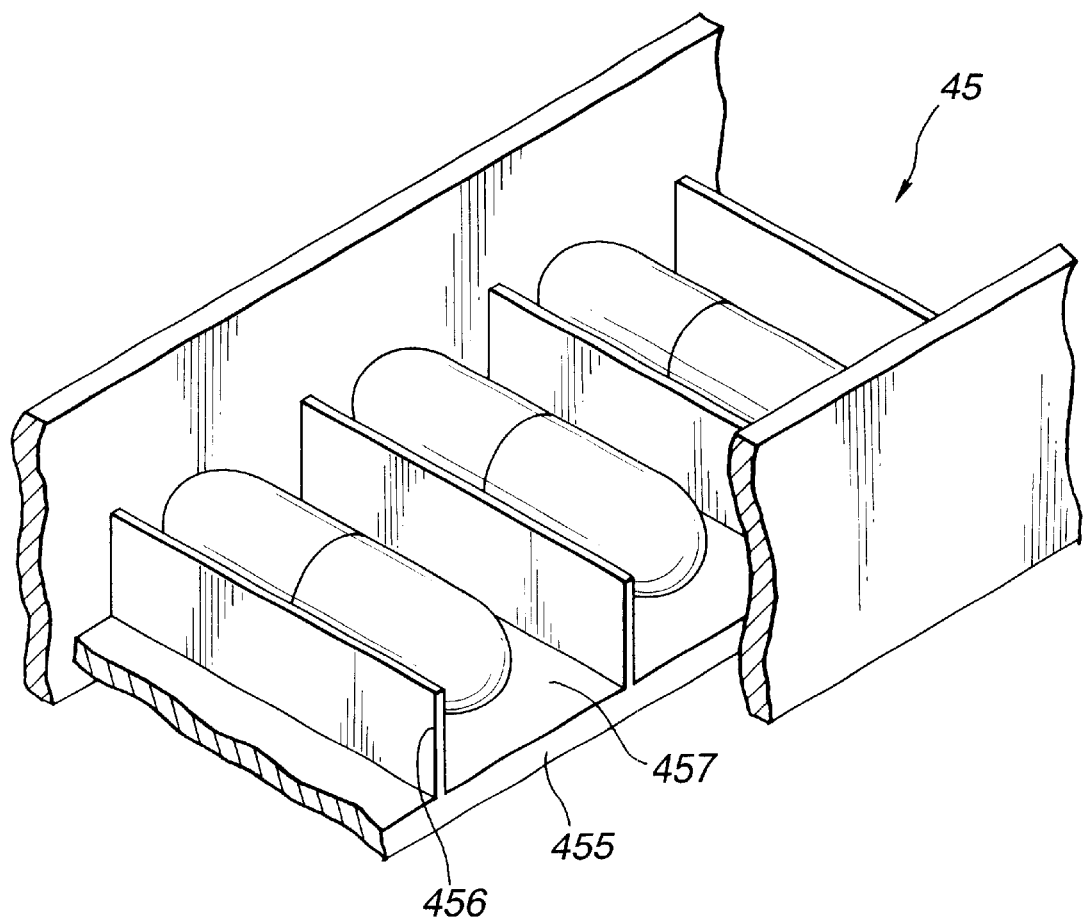
FIG. 6 is a sectional view, partly on an enlarged scale, showing a defective recovering conveyor of the weight selecting apparatus.

In this case, as shown in FIG. 6, the defective recovering conveyor 45 includes a conveyor belt 455; a number of partitioning walls 456 erected on the carrying plane of the conveyor belt 455 in such a manner as to be spaced from each other with equal intervals; and capsule holding portions 457 formed between adjacent ones of the partitioning walls 456. Capsules having been fed from each defective ejecting chute 42 are contained and held in the capsule holding portions 457 on a one-by-one basis to be thus carried. The defective recovering conveyor 45 is intermittently rotated in the direction D in FIG. 2 upon calibration, whereby capsules contained and held in the capsule holding portions 457 on the one-by-one basis are sequentially dropped on the second weighing unit 6 through the sampling chute 454 one by one and are measured in weight by the second weighing unit 6 one by one.

Here, as an instrument for weight measurement in the second weighing unit 6, there may be adopted any weight measuring instrument insofar as it is capable of automatically performing zero point adjustment and weight measurement with a high accuracy. While not exclusively, a Mettler balance is suitably used, and it is also adopted in this embodiment.

The calibration unit (not shown) starts the above-described sampling action at arbitrary intervals previously set, and performs calibration of each differential transformer type balance 21 on the basis of the result of weight measurement by the second weighing unit 6. The calibrating operation by the calibration unit is performed by comparing, for the same capsule, the result of weight measurement by the differential transformer type balance 21 of the first weighing unit 2 with the result of weight measurement by the second weighing unit 6, and discriminating whether or not a difference therebetween is within a specific error range, thereby determining whether or not the differential transformer type balance 21 is required to be adjusted or repaired.

Here, each of the acceptability determining unit (not shown) and the calibration unit (not shown) may be comprised of a suitable computer. In this case, both the acceptability determining unit and the calibration unit may be comprised of one computer. In addition, reference numeral 11 in FIG. 1 indicates a brush roller for certainly loading capsules to be inspected from the hopper 1 into the feed pockets 311 of the feed drum 31 on the one-to-one basis.

Next, there will be described the operation of the weight selecting apparatus in this embodiment upon weight Inspection of capsules and also upon calibration.

First, the operation of the weight selecting apparatus for weight Inspection of capsules will be described. Capsules contained at random In the hopper 1 are transferred to and held In the feed pockets 311 of the feed drum 31 In upright postures, and are carried downward by intermittent rotation of the feed drum 31 in a state being contained and held In the feed pockets 311 of the feed drum 31. In this case, at the step of transfer of capsules from the hopper 1 into the feed pockets 311, the delivery (or loading) of the capsules from the hopper 1 Into the feed pockets 311 on the one-by-one basis Is smoothly performed by the aid of suction of the interior of each feed pocket 311 through the corresponding suction shoe 312 (see FIG. 3) and the brushing action due to rotation of the brush roller 11. Further, each capsule carried downward by rotation of the feed drum 31 in the state being contained in each feed pocket 311 certainly reaches the lowermost point of the feed drum 31 while being prevented from being slipped off by the cover plate 313 (see FIGS. 1 and 3). As shown in FIG. 3, at the lowermost point of the feed drum 31, each capsule is delivered, as kept in its upright posture, from each feed pocket 311 to each carrying pocket 321 of the carrying roller 32 rotated in synchronization with the feed drum 31.

Each capsule delivered into each carrying pocket 321 of the carrying roller 32 is, as shown in FIGS. 3 and 5, carried downward by rotation of the carrying roller 32 in the state being contained in the carrying pocket 321 in the upright posture. At this time, each capsule contained in each carrying pocket 321 in the upright posture is carried, with its leading end projecting from the outer peripheral surface of the carrying roller 32, to a position at which the posture changing plate 322 is disposed. Then, as shown in FIG. 5, the projecting end of each capsule is pushed in the lateral direction by one inner edge of the V-shaped groove 323 of the posture changing plate 322, so that each capsule is turned sideways to be contained in each carrying pocket 321 and is certainly carried up to the lowermost point of the carrying roller 32 while being prevented from being slipped off by the posture changing plate 322. As shown in FIG. 3, at the lowermost point of the carrying roller 32, the capsule in the carrying pocket 321 is placed on the pan 24 of the differential transformer type balance 21 of the first weighing unit 2, and the weight of the capsule is measured by the differential transformer type balance 21 during a period when the intermittently rotated carrying roller 32 is kept as stopped.

The acceptability determining unit (not shown) compares the result of weight measurement by the differential transformer type balance 21 with a preset specific reference value; discriminates whether or not a difference therebetween is within a specific allowable range, and determines the capsule as a non-defective one if the difference is within the allowable range and as a defective one if it is out of the allowable range. In the case where the measured value obtained either of 12 pieces of the differential transformer type balances 21 is determined to be defective, a defective detecting signal is immediately transmitted to a control unit (not shown) for controlling opening/closing of the non-defective/defective selecting shutters 43, to open the non-defective/defective selecting shutter 43 provided on the ejecting chute 41 concerned, thus leading to a state shown by a two-dot chain line in FIG. 3, that is, the upper end opening portion of the defective ejecting chute 42 is opened and the ejecting chute 41 is blocked by the shutter 43.

Then, the carrying roller 32 is intermittently rotated again, so that as shown in FIG. 4, the capsule contained in the carrying pocket 321 is moved from the pan 24 to a position over the upper end opening portion of the ejecting chute 41, and is slipped off from the carrying pocket 321 by its dead weight and is dropped in the ejecting chute 41. The capsule determined as a non-defective one by the acceptability determining unit flows down in the ejecting chute 41 by its dead weight, and is placed on the non-defective recovering conveyor 44 and is carried rightward in FIG. 2 by rotation of the non-defective recovering conveyor 44 in the direction A in FIG. 2 to be thus ejected and recovered through the non-defective recovering chute 441.

On the other hand, the capsule determined as a defective one by the acceptability determining unit flows down by its dead weight in the ejecting chute 41 being in a state in which the non-defective/defective selecting shutter 43 is opened, being dropped in the defective ejecting chute 42 branched from the ejecting chute 41, and is placed on the defective recovering conveyor 45 through the defective ejecting chute 42. The defective capsule placed on the defective recovering conveyor 45 is carried leftward in FIG. 2 by rotation of the defective recovering conveyor 45 in the direction B in FIG. 2, and is contained in the defective recovering vessel 452 through the defective recovering chute 451.

Upon ejection/recovering of the defective capsules, it is confirmed whether or not the capsules determined as defective ones by the acceptability determining unit (not shown) are ejected through the defective ejecting chute 42 by detecting passing of the capsules by means of the defective ejection sensor 453 (see FIG. 1), and in the case where the ejection of even one defective capsule is not confirmed, the non-defective recovering conveyor 44 is reversely rotated in the direction C in FIG. 2 to carry all of the capsules on the non-defective recovering conveyor 44 leftward in FIG. 2 and are recovered in the temporarily storing vessel 443 through the temporarily storing chute 442, in order to certainly prevent entrainment of any defective capsule in the non-defective capsules. In addition, the capsules recovered in the temporarily storing vessel 443 may be returned into the hopper 1 to be subjected to weight measurement again.

Thereafter, the same operation is continuously repeated to automatically select capsules into non-defective ones and defective ones and recover them. In this case, in the weight selecting apparatus in this embodiment, the differential transformer type balance 21 of the first weighing unit 2 is automatically calibrated at intervals previously arbitrarily set in the calibration unit (not shown).

In the case where a calibration program in the apparatus in this embodiment starts, weights of capsules are measured by the differential transformer type balance 21 and then the measured result is stored in the calibration unit (not shown) and at the same time, the non-defective/defective selecting shutter 43 is unconditionally opened irrespective of the determined result obtained by the acceptability determining unit or without acceptability determination. Accordingly the capsules having been measured in weight by the differential transformer type balance 21 are all dropped on the defective recovering conveyor 45 through the defective ejecting chute 42, and as shown in FIG. 6, the capsules are contained in the capsule holding portions 457 of the defective recovering conveyor 45 on a one-by-one basis. Then, the defective recovering conveyor 45 is intermittently rotated in the direction reversed to the rotational direction upon normal defective recovery, that is, in the direction D in FIG. 2, so that the capsules contained and held in the capsule holding portions 457 on the one-by-one basis are sequentially dropped, one by one, on the second weighing unit 6 through the sampling chute 454 and are measured in weight, one by one, by means of the second weighing unit 6. In this case, the capsules are dropped on the pan of the Mettler balance of the second weighing unit 6 one by one. In the apparatus shown in the figure, 12 pieces of the capsules are finally placed on the pans of the Mettler balance for each calibration. The Mettler balance is configured such that zero point adjustment is automatically performed directly after weight measurement of one capsule, and thereby it certainly performs weight measurement of capsules one by one. During such calibration, the weight selecting operation is in a once stopped state.

The result of weight measurement of each capsule by the second weighing unit 6 is supplied to the calibration unit (not shown). The calibration unit compares, for the same capsule, the above result with the result of weight measurement by the differential transformer type balance 21 of the first weighing unit 2; discriminates whether or not the difference therebetween is within a specific error range; and determines whether or not the above differential transformer type balance 21 is required to be adjusted or repaired. As a result, in the case where it is determined that any one of the differential transformer type balances 21 is not required to be adjusted or repaired, the apparatus starts again to repeat the above-described weight selecting operation. On the other hand, in the case where it is determined that any one of the differential transformer type balances 21 is required to be adjusted or repaired, the apparatus is left as stopped, and informs an operator of a warning sign and also displays on a display unit (not shown) information indicating which differential transformer type balance 21 is required to be adjusted or repaired. After the operator adjusts or repairs the deficient differential transformer type balance 21 on the basis of the information, the apparatus starts again to repeat the above-described weight selecting operation. In this case, by recording the capsules having been processed from the last calibration to the present calibration, returning the capsules in the hopper, and re-inspecting them, it becomes possible to perform highly reliable inspection without time-wasting.

Thereafter, the above weight selection is performed with the above calibrating operation inserted therein at intervals previously arbitrarily set. In this case, the capsule, which has been sampled for calibration and placed on the pan of the Mettler balance, may be removed for each calibration. The Mettler balance performs zero point adjustment for each calibration even if the capsule remains on the pan, and accordingly, after the capsules are accumulated somewhat on the pan, they may be removed. In addition, the capsule removed from the pan may be returned into the hopper 1 and subjected to weight inspection again.

[Embodiment 2]

Figure 7:
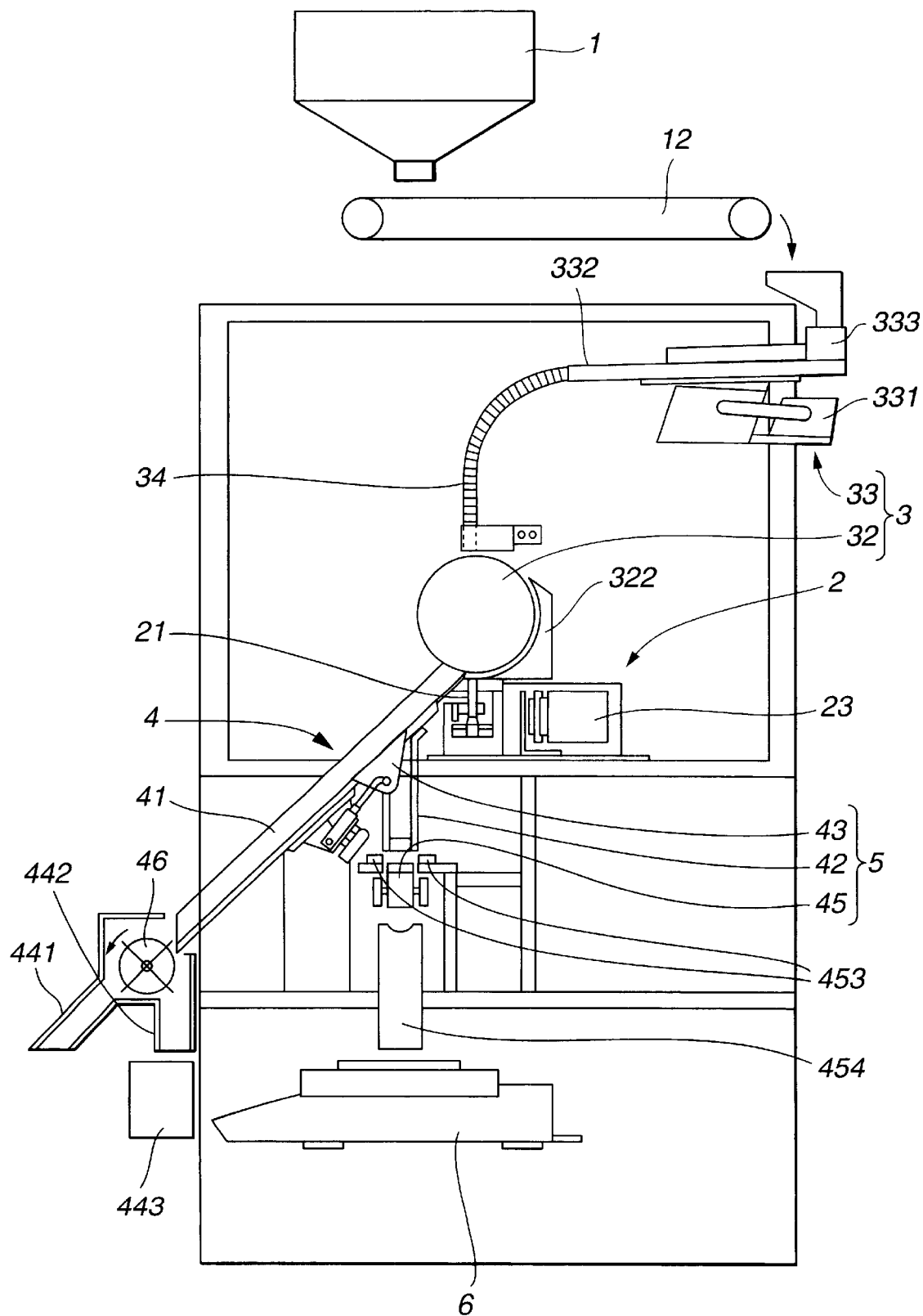
FIG. 7 is a front view of the schematic configuration of a weight selecting apparatus according to a second embodiment of the present invention.
Figure 8:
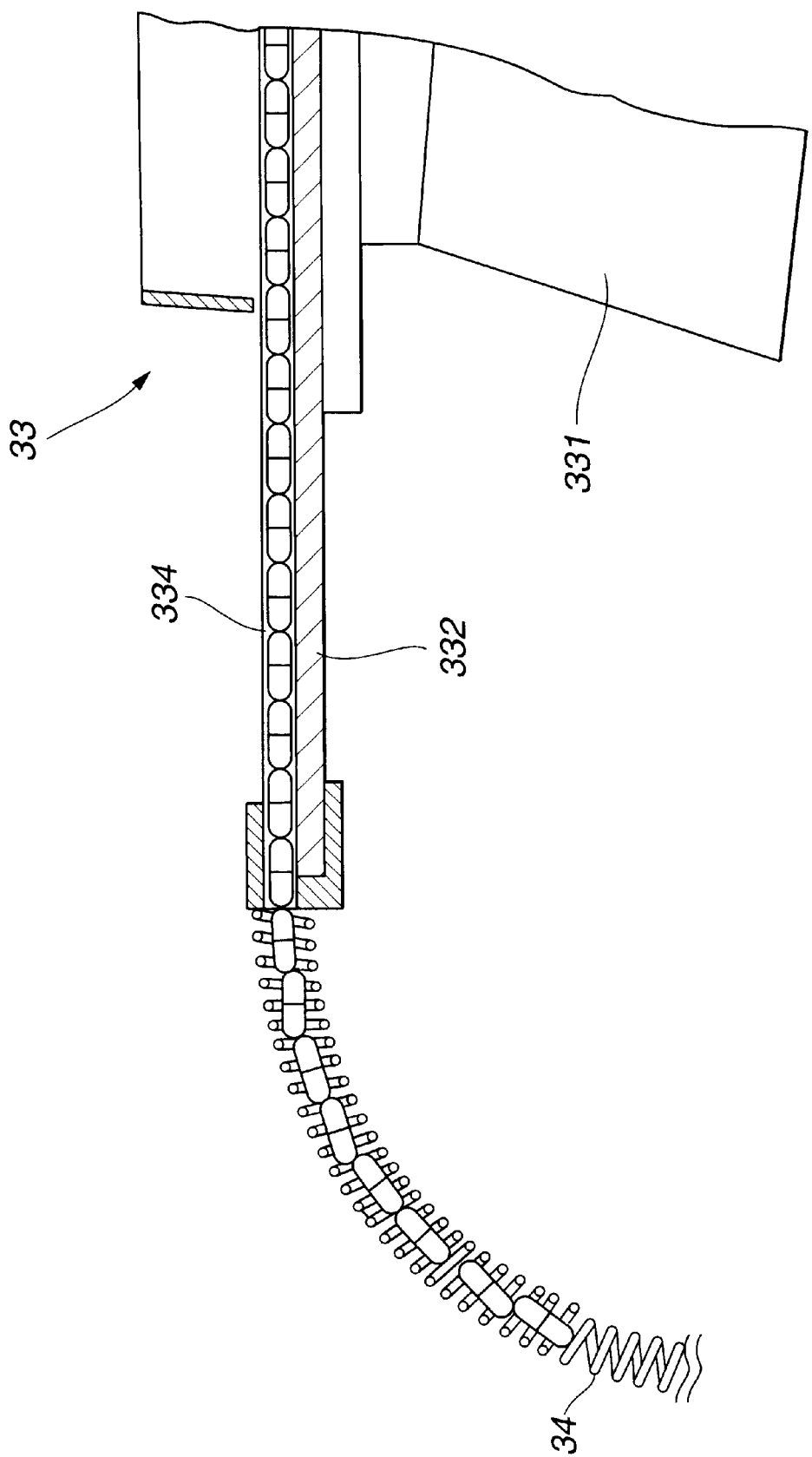
FIG. 8 is a sectional view, partly on an enlarged view, showing a vibration feeder for feeding capsules to a carrying roller of the weight selecting apparatus shown in FIG. 7.
Figure 9:
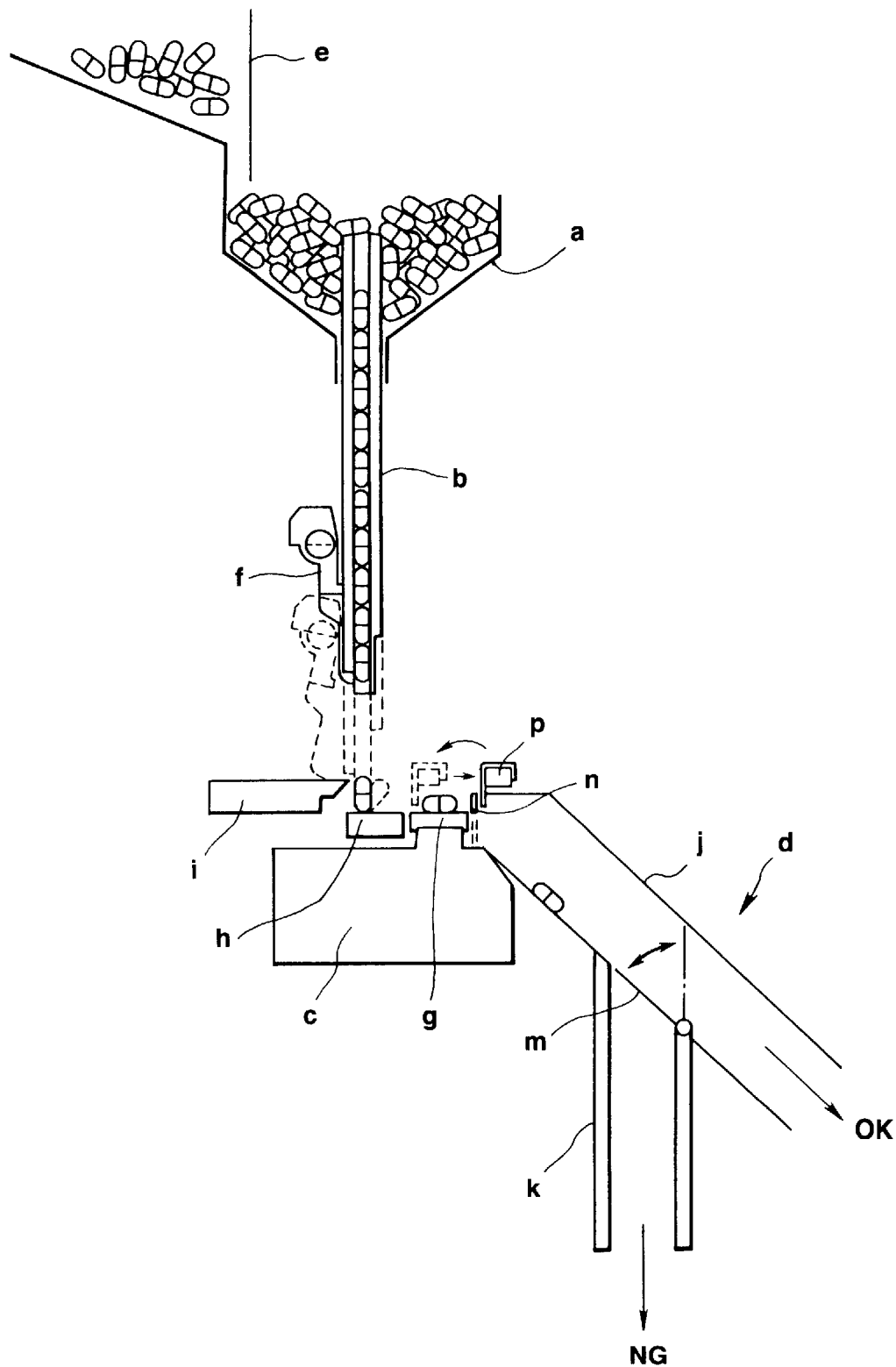
FIG. 9 is a schematic view showing a related art weight selecting apparatus.

FIGS. 7 and 8 show a weight selecting apparatus according to a second embodiment of the present invention, which has a basic configuration substantially identical to that of the first embodiment, except that the feed drum 31 of the apparatus in the first embodiment is replaced with a vibration feeder 33 and the non-defective recovering conveyor 44 of the apparatus in the first embodiment is replaced with a non-defective recovering drum 46 having four blades as a reversely rotatable non-defective recovering/carrying device.

In the weight selecting apparatus, as shown in FIG. 7, capsules to be inspected are supplied at random from a hopper 1 into the vibration feeder 33 via a belt conveyor 12 and are supplied, through a feed pipe 34, into carrying pockets 321 of a carrying roller 32 in upright postures on a one-by-one basis by the above-described vibration feeder 33; and the capsules ejected from an ejecting chute 41 are ejected outside the apparatus through a non-defective recovering chute 441 or recovered in a temporarily storing vessel 443 through a temporarily storing chute 442 by rotation of the above-described non-defective recovering drum 46.

The vibration feeder 33 will be first described. The vibration feeder 33 includes a vibrator 331, and an aligning/feeding plate 332 which is mounted on the vibrator 331 in such a manner as to be tilted a specific angle with respect to the vibrator 331. A plurality of capsule alignment grooves 334 in which capsules are to be loosely fitted are formed in an upper surface portion of the aligning/feeding plate 332 along the length direction. A capsule containing portion 333 for containing capsules charged from the belt conveyor 12 is provided on the upper surface of the aligning/feeding plate 332 at one end portion. The number of the capsule alignment grooves 334 corresponds to the number of rows of the carrying pockets 321 provided in the carrying roller 32. In this embodiment, since the carrying roller 32 has 12 rows of the carrying pockets 321 like the first embodiment, the number of the capsule alignment grooves 334 is set at 12 pieces.

A plurality of the feed pipes 34, each being communicated to the leading end of one of the capsule alignment grooves 334, are connected to the leading end of the aligning/feeding plate 332. The leading end of each feed pipe 34 is, as shown in FIG. 7, fixed correspondingly to one of the carrying pockets 321 of the carrying roller 32 in a state being close to the outer peripheral surface of the carrying roller 32. In this embodiment, as shown in FIG. 8, the feed pipe 34 is comprised of a spiral pipe which is formed of a piano wire spirally wound, whereby vibration of the aligning/feeding plate 332 is absorbed by flexure of the spiral pipe.

The feeding of capsules using the vibration feeder 33 is performed as follows. First, capsules fed at random from the hopper 1 on the belt conveyor 12 are charged in the capsule containing portion 333 of the vibration feeder 33 via the belt conveyor 12, and are fed on the aligning/feeding plate 332 vibrated by vibration generated by the vibrator 331. The capsules fed on the aligning/feeding plate 332 are dropped in the capsule alignment grooves 334 formed in the aligning/feeding plate 332 by vibration of the aligning/feeding plate 332, and as shown in FIG. 8, the capsules are aligned along the longitudinal direction in each of the capsule alignment grooves 334 and are sequentially fed, by vibration, to one of the feed pipes 34 in the state being aligned in the longitudinal row. The capsules, passing through the feed pipe 34, are fed in upright postures one by one into the carrying pockets 321 of the carrying roller 32 intermittently rotated.

Next, the non-defective recovering drum 46 adopted as the non-defective recovering/carrying device will be described. The non-defective recovering drum 46, having four blades and being rotatable normally and reversely, is disposed between the ejecting chute 41 and a branch point at which the temporarily storing chute 442 is branched from the non-defective recovering chute 441.

The non-defective recovering drum 46 is usually rotated counterclockwise as shown by an arrow in FIG. 7, to feed the capsules flowing in the ejecting chute 41 into the non-defective recovering chute 441, thereby ejecting the non-defective capsules outside the apparatus. In the case where ejection of any defective capsule is not confirmed by a defective ejection sensor 453 although a defective capsule is detected by an acceptability determining unit (not shown), the non-defective recovering drum 46 is reversely rotated clockwise in the figure, to feed the capsules flowing in the ejecting chute 41 into the temporarily storing chute 442 and recover all of the capsules into the temporarily storing vessel 443 through the temporarily storing chute 442.

It is to be noted that the other configuration, operation, function and effect are the same as those in the first embodiment, and therefore, the same parts are indicated by the same reference numerals and the explanation thereof is omitted.

As described above, according to the weight selecting apparatus in each of the first and second embodiments, it is possible to perform weight inspection of capsules while automatically performing calibration at specific intervals previously arbitrarily set, and hence to effectively perform highly accurate, highly reliable weight inspection without the necessity of performing burdensome calibrating operation by manual works.

In the weight selecting apparatus in each of the first and second embodiments, since upon calibration, the defective ejecting chute 42, non-defective/defective selecting shutter 43 and defective recovering conveyor (defective recovering/carrying device) 45, which constitute main parts of the selecting means 4, constitutes main parts of the sampling means 5, it is possible to certainly perform sampling for calibration with a relatively simple mechanism by making use of the defective ejecting path without provision of any complicated path, and hence to miniaturize the apparatus and reduce the parts cost. Further, since the usual weight measurement or inspection cannot be naturally performed until the accuracy of each differential transformer balance 21 of the first weighing unit 2 is confirmed, the inspection efficiency is not reduced even by performing sampling for calibration by making use of the selecting means 4 as described above.

In the apparatus in each of the first and second embodiments, ejection of a capsule determined as a defective one by the acceptability determining unit (not shown) is detected by the defective ejection sensor 453, and in the case where ejection of any defective capsule is not detected although a capsule is determined as a defective one by the acceptability determining unit, the non-defective recovering conveyor 44 (first embodiment) or the non-defective recovering drum 46 (second embodiment) is reversely rotated to prevent entrainment of a defective capsule in non-defective capsules. This makes it possible to certainly prevent entrainment of a defective capsule in non-defective capsules, and hence to perform weight measurement with an extremely high reliability.

In the apparatus in each of the first and second embodiments, the carrying means 3 is comprised of the feed drum 31 (first embodiment) or the vibration feeder 33 (second embodiment) and the carrying roller 32, wherein each capsule is carried on the pan 24 of the first weighing unit 2 by intermittent rotation of the carrying roller 32, and is fed in the ejecting chute 41 of the selecting means 4 after weight measurement by intermittent rotation of the carrying roller 32. Accordingly, the number of parts of the carrying means of the present invention is small as compared with the carrying means of the above-described related art weight selecting apparatus, and further, the carrying means of the present invention does not require any complicated drive mechanism or control mechanism because only the feed drum 31 or vibration feeder 33 and carrying roller 32 are taken as movable parts and the motion of each part is simple intermittent rotation or vibration.

Consequently, according to the weight selecting apparatus of the present invention, as compared with the above-described related art weight selecting apparatus in which objects to be inspected are carried by controlling a number of movable parts requiring complicated motions with timings adjusted accurately, it is possible to accurately, certainly carry objects to be inspected by a simple mechanism with a reduced number of parts, and hence to improve the processing ability and reduce the cost.

It is to be noted that the weight selecting apparatus of the present invention is not limited to the above-described embodiments but can be modified in various forms. For example, although in the above embodiments the carrying means 3 is comprised of the feed drum 31 (first embodiment) or vibration feeder 33 (second embodiment) and the carrying roller 32, it may be of any type insofar as it is capable of certainly carrying capsules to the first weighing unit 2 one by one. Further, although in the above embodiments, capsules for calibration are sampled using the defective ejecting chute 42, non-defective/defective selecting shutter 43 and defective recovering conveyor (defective recovering/carrying device) 45 of the selecting means 4, the sampling means may be provided independently from the selecting means 4. The selecting means 4 is not limited to the configuration using the defective ejecting chute 42 branched from the ejecting chute 41 and the non-defective/defective selecting shutter 43, but it may be of any type insofar as it is capable of certainly selecting capsules into non-defective ones and defective ones on the basis of the determined result of the acceptability determining unit. The balances used for the first weighing unit 2 and the second weighing unit 6 are not limited to the differential transformer type balance and Mettler balance respectively but may be other balances or weight measuring instruments. Although in the above embodiments, in the case where the inconvenience of the first weighing unit 2 is detected by calibration, the operator adjusts or repairs the first weighing unit 2, the adjustment or repairing work can be automatically performed using a suitable adjusting means or repairing means. The other configurations may be suitably changed without departing from the scope of the present invention.

As described in the above embodiments, the weight selecting apparatus of the present invention is suitable used for weight measurement of capsules; however, the objects to be inspected are not limited to capsules. The weight selecting apparatus of the present invention may be suitably used for weight measurement of various products, for example, other medicines such as tablets, foods, and chemicals, and other articles.

According to the present invention, there is provided, as the second invention, the weight selecting apparatus characterized in that the intermittently rotatable feed roller having the carrying pockets in the outer peripheral portion are used as the carrying means for carrying objects to be inspected to the weighing base one by one. In this case, depending on the kind of objects to be inspected or the like, the calibration function can be omitted. For example, a weight selecting apparatus can be provided in which the members and mechanism associated with only calibration are omitted from the weight selecting apparatus in each of the above embodiments.

As described above, according to the weight selecting apparatus of the present invention, it is possible to perform weight inspection of capsules while automatically performing calibration at specific intervals previously arbitrarily set, and hence to effectively perform highly accurate, highly reliable weight inspection without the necessity of performing burdensome calibrating operation by manual works.

Further, according to the weight selecting apparatus in which the intermittently rotatable carrying roller having the carrying pockets in the outer peripheral portion are used as the carrying means, it is possible to certainly carry objects to be inspected with a relatively simple mechanism and then perform weight measurement of the objects to be inspected, and hence to improve the processing ability and reduce the cost such as the parts cost or manufacturing cost.

What is claimed is:

1. A weight selecting apparatus comprising:

a feed unit for continuously feeding objects to be inspected;

a first weighing unit for measuring weights of the objects;

a carrying means for carrying the objects fed from said feed unit to said first weighing unit one by one;

an acceptability determining unit for comparing the result of weight measurement by said first weighing unit with a specific reference value to determine the acceptability of each of the objects;

an ejecting chute for ejecting the objects having been subjected to weight measurement by said first weighing unit;

a defective ejecting chute, branched from said ejecting chute;

a reversely rotatable defective recovering/carrying device for carrying the objects fed from said defective ejecting chute;

a non-defective/defective selecting shutter, provided at the branch point where said defective ejecting chute is branched from said ejecting chute, for opening/closing a port of said defective ejecting chute;

a second weighing unit for calibration, which is adapted to measure weights of sampled objects having been subjected to weight measurement by said first weighing unit; and a calibration unit for comparing, for the same object, the result of weight measurement by said first weighing unit with the result of weight measurement by said second weighing unit and determining whether or not a difference therebetween is within a specific error range;

wherein in a usual state, the objects continuously fed from said feed unit are carried to said first weighing unit one by one by said carrying means and are subjected to weight measurement by said first weighing unit, being subjected to acceptability determination on the basis of the measured results by said acceptability determining unit, said non-defective/defective selecting shutter is opened/closed on the basis of the determined results, the non-defective objects are ejected through said ejecting chute to be recovered and the defective objects are introduced from said ejecting chute to said defective recovering/carrying device through said defective ejecting chute to be recovered, to thereby select the objects into non-defective ones and defective ones and recover them; and at specific intervals, said non-defective/defective selecting shutter is unconditionally opened to introduce the objects having being subjected to weight measurement by said first weighing unit to said defective recovering/carrying device through said defective ejecting chute, said defective recovering/carrying device is reversely rotated to feed the objects to said second weighing unit, those of the objects thus fed to said second weighing unit are subjected to weight measurement by said second weighing unit; and for the same object, the measured result is compared with that obtained by said first weighing unit by means of said calibration unit, to perform calibration of said first weighing unit.

2. The weight selecting apparatus according to claim 1, further comprising:

a defective ejection sensor for detecting passing of the objects, which is mounted on said defective ejecting chute or in the vicinity of an ejection port thereof; and a reversely rotatable non-defective recovering/carrying device for recovering non-defective ones of the objects, which is disposed ahead of said ejecting chute;

wherein ejection of the object determined as a defective one by said acceptability determining unit is detected by said defective ejection sensor, and in the case where said defective object is not detected, said non-defective recovering/carrying device is reversely rotated to prevent entrainment of said defective object in the non-defective objects.

3. The weight selecting apparatus according to claim 2, wherein said carrying means includes at least one intermittently rotatable carrying roller having in its outer peripheral surface portion a plurality of carrying pockets for containing the objects, wherein the objects are contained in said carrying pockets on a one-to-one basis and carried by intermittent rotation of said carrying roller; each of the objects is placed on a weighing base of said first weighing unit at the lowermost point of said carrying roller in a state being contained in the corresponding one of said carrying pockets, being subjected to weight measurement in a period in which the carrying roller is left as intermittently stopped, and is moved from said weighing base by intermittent rotation of said carrying roller; and the object thus measured in weight is ejected from said carrying pocket and is transferred to said ejecting chute.

4. The weight selecting apparatus according to claim 1, wherein said carrying means includes at least one intermittently rotatable carrying roller having in its outer peripheral surface portion a plurality of carrying pockets for containing the objects, wherein the objects are contained in said carrying pockets on a one-to-one basis and carried by intermit tent rotation of said carrying roller; each of the objects is placed on a weighing base of said first weighing unit at the lowermost point of said carrying roller in a state being contained in the corresponding one of said carrying pockets, being subjected to weight measurement in a period in which the carrying roller is left as intermittently stopped, and is moved from said weighing base by intermittent rotation of said carrying roller; and the object thus measured in weight is ejected from said carrying pocket and is transferred to said ejecting chute.

* * * * *